(12) United States Patent
Jupe (10) Patent No.: US 9,410,648 B2
(45) Date of Patent: Aug. 9, 2016

(54) REMOTE CAM-LOCK COUPLING ACTUATOR AND DISCHARGE CONTAINMENT DEVICE

(71) Applicant: Michael A. Jupe, West, TX (US)

(72) Inventor: Michael A. Jupe, West, TX (US)

( * ) Notice: Subject to any disclaimer, the term of this patent is extended or adjusted under 35 U.S.C. 154(b) by 407 days.

(21) Appl. No.: 13/830,837

(22) Filed: Mar. 14, 2013

(65) Prior Publication Data

US 2013/0199021 A1 Aug. 8, 2013

(51) Int. Cl.
*F16L 21/08* (2006.01)
*F16L 37/18* (2006.01)

(52) U.S. Cl.
CPC ............... *F16L 21/08* (2013.01); *F16L 37/18* (2013.01); *Y10T 29/49947* (2015.01)

(58) Field of Classification Search
CPC . F16L 37/0841; F16L 37/0982; F16L 37/133; F16L 37/138; Y10T 29/49947
USPC .................. 285/307, 308, 312, 320, 394, 920
See application file for complete search history.

(56) References Cited

U.S. PATENT DOCUMENTS

| 949,608 | A | * | 2/1910 | Watt | F16L 37/18 285/312 |
| 4,610,468 | A | * | 9/1986 | Wood | F16L 37/0982 285/307 |
| 4,923,228 | A | * | 5/1990 | Laipply | F16L 37/0982 285/319 |
| 4,979,765 | A | * | 12/1990 | Bartholomew | F16L 37/0982 285/308 |
| 5,005,876 | A | * | 4/1991 | Fahl | F16L 37/18 285/311 |
| 5,100,182 | A | * | 3/1992 | Norkey | F16L 37/0982 285/318 |
| 5,954,373 | A | * | 9/1999 | Sorkin | E04C 5/10 285/312 |
| 7,690,694 | B2 | * | 4/2010 | Poder | F16L 37/0985 285/308 |
| 8,696,037 | B2 | * | 4/2014 | Nakamura | F16L 37/0982 285/314 |

FOREIGN PATENT DOCUMENTS

WO    WO2010/109828    *  3/2010

* cited by examiner

*Primary Examiner* — Christopher M Koehler
(74) *Attorney, Agent, or Firm* — William Lovin & Associates, LLC; William R. Lovin (57) ABSTRACT

This invention relates to a means of remotely coupling and decoupling various devices connected to: 1) Municipal drinking (potable), reuse (non-potable), industry process water, and wastewater treatment systems; and, 2) Industrial fluid distribution systems by means of a remotely actuated cam-lock coupling actuator and discharge containment device capable of remotely locking and unlocking the locking handles found on conventional female cam-lock couplings while simultaneously containing the forceful spray discharge ordinarily encountered when decoupling occurs.

6 Claims, 6 Drawing Sheets

REMOTE CAM-LOCK COUPLING ACTUATOR AND DISCHARGE CONTAINMENT DEVICE

CROSS-REFERENCE TO RELATED APPLICATIONS

Not applicable.

FIELD OF THE INVENTION

This invention relates to a means of remotely coupling and decoupling various devices connected to: 1) Municipal drinking (potable), reuse (non-potable), industry process water, and wastewater treatment systems; and, 2) Industrial fluid distribution systems by means of a remotely actuated cam-lock coupling while simultaneously containing the spray discharge ordinarily encountered when decoupling occurs.

BACKGROUND OF THE INVENTION

The need to periodically flush portions of pressurized water distribution systems to maintain the water quality is well known in the prior art. There are many reasons for this. First, when such systems are first constructed or enlarged, flushing is required to remove post-construction contaminants from the lines. Second, such systems suffer breaks and leaks with resulting infiltration by contaminants requiring post repair flushing. Third, properly functioning pressurized water distribution systems contain "dead-end" mains or pipes and distribution branches that necessarily suffer "low-flow" conditions. For example, fire codes and land development ordinances often dictate that oversized water mains must be installed to deliver sufficient water when needed. Such water mains necessarily suffer low-flow conditions with extended water residence time in the mains.

Low-flow conditions and extended water residence times are well known to cause water quality problems, including loss of disinfectant residual, disinfection by-product (DBP) formation (i.e. the formation of disinfectant by-products when organic and inorganic products naturally present in the water react with the chemical treating agents in the water), bacteria and larval growth, increased turbidity, metal and mineral uptake from the pipes themselves, debris accumulation, and numerous other conditions that cause end-user taste and odor complaints. Periodic prophylactic flushing of such systems is thus necessary to replace old water with fresh water to remove contaminants from the system and improve water quality.

Numerous examples in the prior art are available to facilitate the process of flushing a pressurized water distribution system. Many of these flushing devices are constructed underground below the freeze line and variously comprise manually and electrically actuated valves, pressure sensors, temperature sensors and the like and as such require periodic maintenance. Ordinarily, it is necessary to excavate and physically disconnect these components from the water system when maintenance is necessary.

What is needed then is a means of remotely coupling and decoupling these flushing devices en bloc from a pressurized water system so that they may be removed and repaired without the need for excavation. Such a device should be implemented such that operation may be effectuated by means of simple hand levers, or, alternately, by means of a remote or self-contained electric, pneumatic, or hydraulic motor. Also, since a powerful, radially directed spray of water is ordinarily emitted when such flushing devices are disconnected from the pressurized water system, an integral means of containing this spray so that it does not damage the area in which the flushing device is installed is also required.

SUMMARY OF THE INVENTION

The preferred embodiment of the present invention comprises a central conduit or pipe externally threaded at both ends with a standard NPT thread. Threaded on to one end of this central conduit or pipe is a female-to-female NPT threaded adapter. Threaded onto the opposite end, is a female cam-lock coupling. Between the female-to-female NPT adapter and the female cam-lock coupling and slidably displaceable with respect to the central conduit or pipe is a cam-lock coupling actuator and discharge containment shroud. The cam-lock coupling actuator and discharge containment shroud is comprised of two concentrically disposed open end cylinders. The first open end cylinder is in intimate contact with the outer surface of the central conduit or pipe such that it is slidably displaceable along the entire length of the central conduit or pipe between the female-to-female NPT threaded adapter and the female cam-lock coupling. The second open end cylinder is of a larger diameter than the first, and is concentrically disposed with respect to the first and affixed to it, such that second extends beyond the first in the direction of the female cam-lock coupling so that when the first open end cylinder is slidably displaced towards the female cam-lock coupling with female NPT threaded adapter, the affixed second open end cylinder slides over and obscures the female cam-lock coupling and a portion of the pipe connected thereto. Further, the second open end cylinder has two longitudinal slots with beveled ends machined or otherwise formed in diametrically opposing sides such that each actuating arm of the female cam-lock coupling protrudes through one of the longitudinal slots. When the first, open end cylinder is slidably displaced towards the female cam-lock coupling with female NPT threaded adapter, the bevel-ended, longitudinal slots in the affixed second open end cylinder pick the arms of the female cam-lock coupling up, and swing them back and away, thus unlocking the female cam-lock coupling. Similarly, when the first, open end cylinder is slidably displaced away from the female cam-lock coupling with female NPT threaded adapter, the bevel-ended, longitudinal slots in the second open end cylinder pull the arms of the female cam-lock coupling back, and swing them down and towards the female cam-lock coupling thus locking the female cam-lock coupling.

In a first embodiment of the present invention, the coupling actuator and discharge containment shroud is slidably displaced by means of rigid rods attached to two lever arms. In a second embodiment of the present invention, the coupling actuator and discharge containment shroud is slidably displaced by means of a separate electrical, pneumatic, or hydraulic motor affixed to the central conduit or pipe between the female to female NPT coupling and the coupling actuator and discharge containment shroud. This motor is mechanically coupled to the coupling actuator and containment shroud and is thus capable of alternately causing the female cam-lock coupling to couple and decouple.

The first embodiment of the present invention is used in the following manner: First, a male cam-lock coupling is affixed to a municipal drinking distribution system. Second, the system or device to be attached to the water distribution system (flush valve, sample station, etc.) is attached to the female NPT coupling at one end of the device. Third, by means of operating levers transmitting force by means of rigid rods, the user slidably displaces the coupling actuator and containment shroud towards the female cam-lock coupling such that the arms of the female cam-lock coupling are picked up, and swung back and away, thus unlocking the female cam-lock coupling. Fourth, the system or device to be attached to the water system with the present invention affixed is juxtaposed with the male cam-lock coupling attached to the water distribution system such that the female cam-lock coupling of present invention may be slidably coupled with to the male cam-lock coupling attached to the water distribution system. Fifth, by means of operating levers transmitting force by means of rigid rods, the user slidably displaces the coupling actuator and containment shroud away from the female cam-lock coupling such that the arms of the female cam-lock coupling are pulled back, and swung down and towards the female cam-lock coupling thus locking the female cam-lock coupling and hydraulically connecting the system or device to the water distribution system. Sixth, at some future time by means of operating levers transmitting force by means of rigid rods, the user slidably displaces the coupling actuator and containment shroud towards the female cam-lock coupling such that the arms of the female cam-lock coupling are picked up, and swung back and away, thus unlocking the female cam-lock coupling. The containment shroud then contains and attenuates any high pressure residual water spray inside the shroud so that it does not damage the area in which the system or device is installed or harm individuals in close proximity. Seventh, the system or device is removed en bloc with the present invention attached so that the system or device may be repaired or modified. Eighth, after the system or device has been repaired or modified the system or device with the present invention attached is replaced en bloc and recoupled with the water distribution system. Ninth, by means of operating levers transmitting force by means of rigid rods, the user slidably displaces the coupling actuator and containment shroud away from the female cam-lock coupling such that the arms of the female cam-lock coupling are pulled back, and swung down and towards the female cam-lock coupling thus locking the female cam-lock coupling and hydraulically reconnecting the system or device to the water distribution system

DETAILED DESCRIPTION OF THE INVENTION

In the following description, numerous specific details regarding possible componentry (e.g., NPT threaded pipe, electric solenoids, pneumatic actuators, and hydraulic actuators) are set forth. Those skilled in the art will recognize, however, that the invention may be practiced apart from these specific details. For example, the invention may be constructed of polyvinylchloride (PVC) pipe and assembled by means of glue or adhesive. All such variations in materials used to construct the present invention are specifically included in the spirit and scope of the disclosure. Similarly, details well known and widely used in the process of manufacturing such equipment (e.g., threading and assembling pipe, plastic injection molding, techniques for assembling electro-mechanical devices, etc.) and various miscellaneous components have been omitted, so as not to unnecessarily obscure the present invention.

Figure 1A:
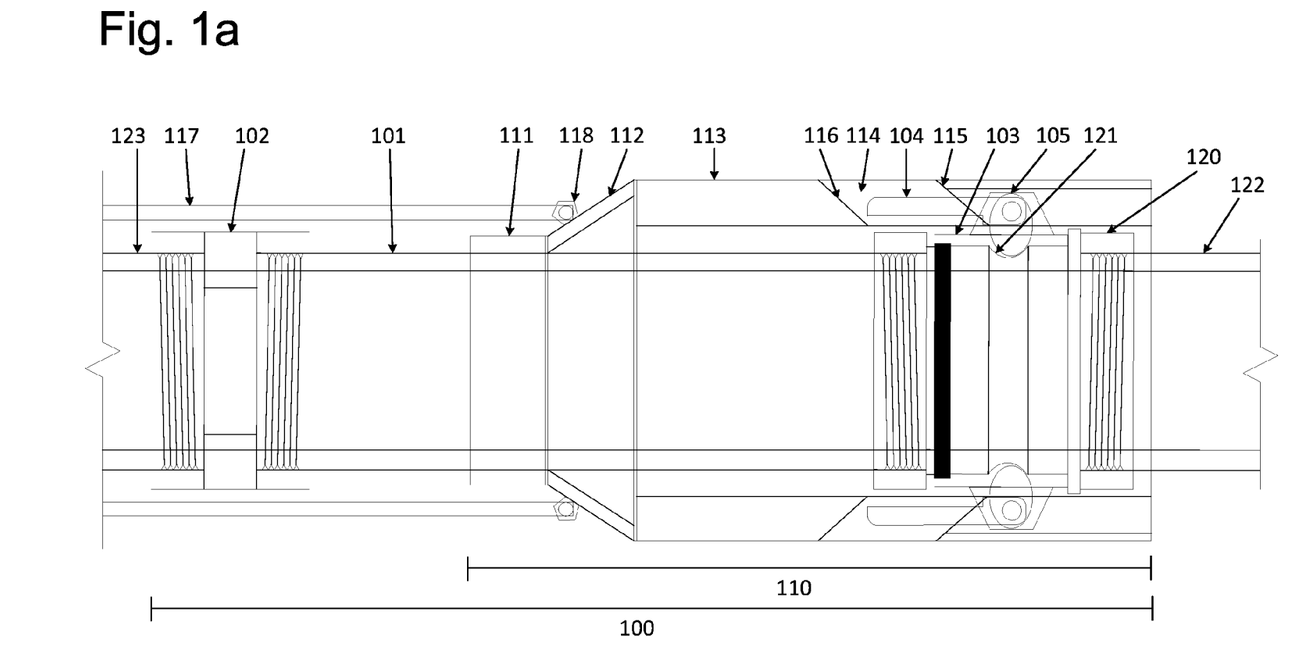
FIG. 1a is a longitudinal, cross-section view of a first embodiment of the present invention showing its internal construction and appearing as it would when coupled to a water supply system.
Figure 1B:
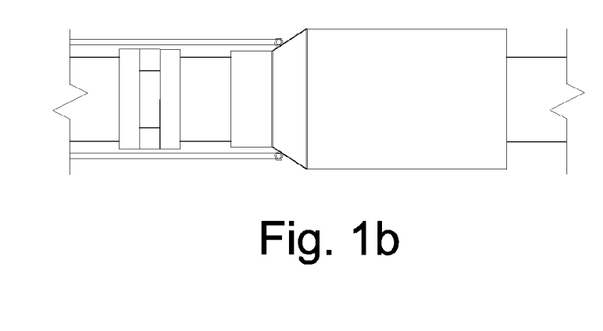
FIG. 1b is a longitudinal view of a first embodiment of the present invention appearing as it would when coupled to a water supply system.

Referring now to FIGS. 1a and 1b, the remote cam-lock coupling actuator and discharge containment device 100 of a first embodiment of the present invention comprises a central conduit or pipe 101 externally threaded at both ends with a standard NPT thread. Threaded on to one end of central conduit or pipe 101 is female-to-female NPT threaded adapter 102. In this embodiment of the present invention female-to-female NPT threaded adapter 102 is used to affix remote cam-lock coupling actuator and discharge containment device 100 to a separate system or device (not shown) by means of connection pipe 123. It will be readily apparent that other types of threaded adapters may be freely substituted for female-to-female NPT threaded adapter 102 it terms of affixing remote cam-lock coupling actuator and discharge containment device 100 to a separate system or device or, indeed, the separate system or device may be directly affixed to central conduit or pipe 101 in lieu of female-to-female NPT threaded adapter 102. Threaded onto the opposite end central conduit or pipe 101 is female cam-lock coupling 103. The female cam-lock coupling is of the ordinary type and further comprises a pair of locking handles 104 interoperating with locking cam lobes 105 such that when locking handles 104 are pivoted out, locking cam lobes 105 pivot also and unlock the female cam-lock coupling. Between female-to-female NPT adapter 102 and female cam-lock coupling 103 is cam-lock coupling actuator and discharge containment shroud 110. Further, cam-lock coupling actuator and discharge containment shroud 110 is slidably displaceable with respect to central conduit or pipe 101. Cam-lock coupling actuator and discharge containment shroud 100 is comprised of two concentrically disposed open end cylinders 111 and 113. First open end cylinder 111 is in intimate contact with the outer surface of central conduit or pipe 101 such that it is slidably displaceable along the entire length of central conduit or pipe 101 between female-to-female NPT threaded adapter 102 and female cam-lock coupling 103. Second open end cylinder 113 is of a larger diameter than the first, and is concentrically disposed with respect to the first and affixed to it, preferably by truncate cone 112 such that second open end cylinder 113 extends beyond first open end cylinder 114 in the direction of female cam-lock coupling 103 so that when first open end cylinder 114 is slidably displaced towards female cam-lock coupling 103, second open end cylinder 113 slides over and obscures female cam-lock coupling 103 and a portion of any male cam-lock coupler 120 and water system pipe 122 connected thereto. Second open end cylinder 113 further comprises two longitudinal slots 114 each with a closing (locking) beveled end 115 and opening (unlocking) beveled end 116 machined or otherwise formed in diametrically opposing sides of second open end cylinder 113 such that each locking handle 104 of female cam-lock coupling protrudes into one of longitudinal slots 114. Opening (unlocking) beveled ends 116 are angled such that when cam-lock coupling actuator and discharge containment shroud 110 is pushed towards female cam-lock coupling 103 locking handles 104 are picked up and swung back and away, thus unlocking the female cam-lock coupling. Similarly, when cam-lock coupling actuator and discharge containment shroud 110 is slidably displaced away from female cam-lock coupling 103, closing (locking) beveled ends 115 are angled such that they pull locking handles 104 back and swing them down thus locking the female cam-lock coupling. Cam-lock coupling actuator and discharge containment shroud 110 is slidably displaced along central conduit or pipe 100 by means of force transmitted via rigid rods 117 and pivots 118 to truncate cone 112. FIG. 1a and FIG. 1b show cam-lock coupling actuator and discharge containment device 100 interconnected between connection pipe 123 and male cam-lock coupler 120 with water system pipe 122 such that locking handles 104 interoperating with locking cam lobes 105 are rotated such that locking cam lobes 105 lock into locking cam groove 121 machined or otherwise formed into the mating surface of male cam-lock coupler 120 and secure the assembly together.

Figures 2A, 2B:
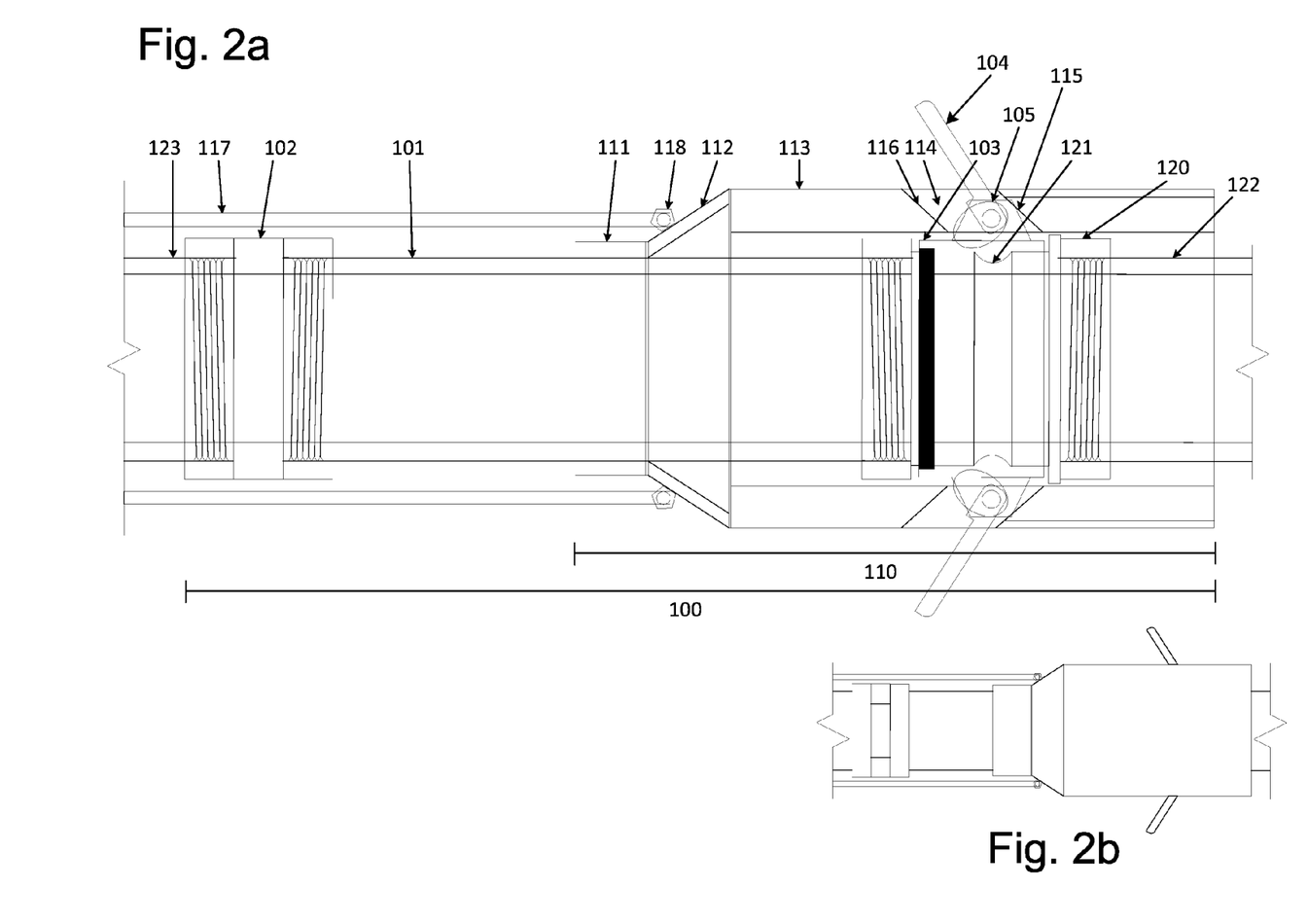
FIG. 2a is a longitudinal, cross-section view of a first embodiment of the present invention showing its internal construction and appearing as it would after the invention has been decoupled from a water supply system.
FIG. 2b is a longitudinal view of a first embodiment of the present invention appearing as it would when decoupled from a water supply system.

Referring now to FIGS. 2a and 2b, the user has applied force by means of rigid rods 117 and pivots 118 to truncate cone 112 thus slidably displacing coupling actuator and containment shroud 110 towards the female cam-lock coupling 103. By this means, opening (unlocking) beveled ends 116 of longitudinal slots 114 slide under locking handles 104 and swing them back and away thus rotating lock cam lobes 105 out of locking cam groove 121 and unlocking the female cam-lock coupling from male cam-lock coupler 120 and water system pipe 122 connected thereto. To reverse the process, the user applies a reverse force by means of rigid rods 117, pivots 118, and truncate cone 112 thus slidably displacing coupling actuator and containment shroud 110 away from female cam-lock coupling 103. By this means, closing (locking) beveled ends 115 of longitudinal slots 114 slide over locking handles 104 and swing them down and towards female cam-lock coupling 103 thus rotating lock cam lobes 105 back into locking cam groove 121 and locking the female cam-lock coupling to male cam-lock coupler 120 and water system pipe 122 connected thereto.

Figure 3:
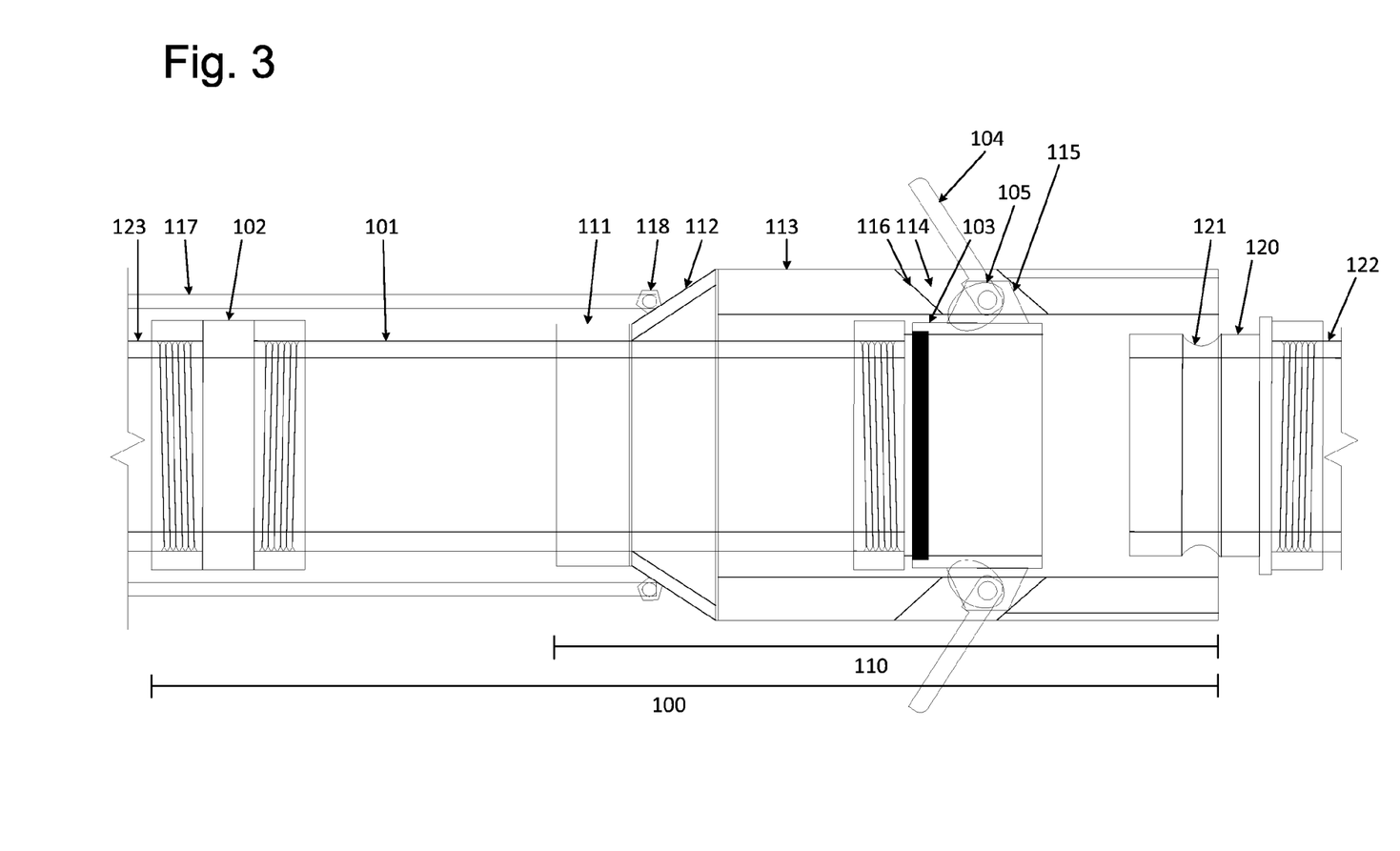
FIG. 3 is a longitudinal, cross-section view of a first embodiment of the present invention showing its internal construction and appearing as it would after the invention has been decoupled and withdrawn from the male cam-lock coupling attached to the water supply system.

Referring now to FIG. 3, remote cam-lock coupling actuator and discharge containment device 100 and any interconnected device or system attached to connection pipe 123 are then free to be decoupled from male cam-lock coupler 120 and water system pipe 122.

Figure 4A:
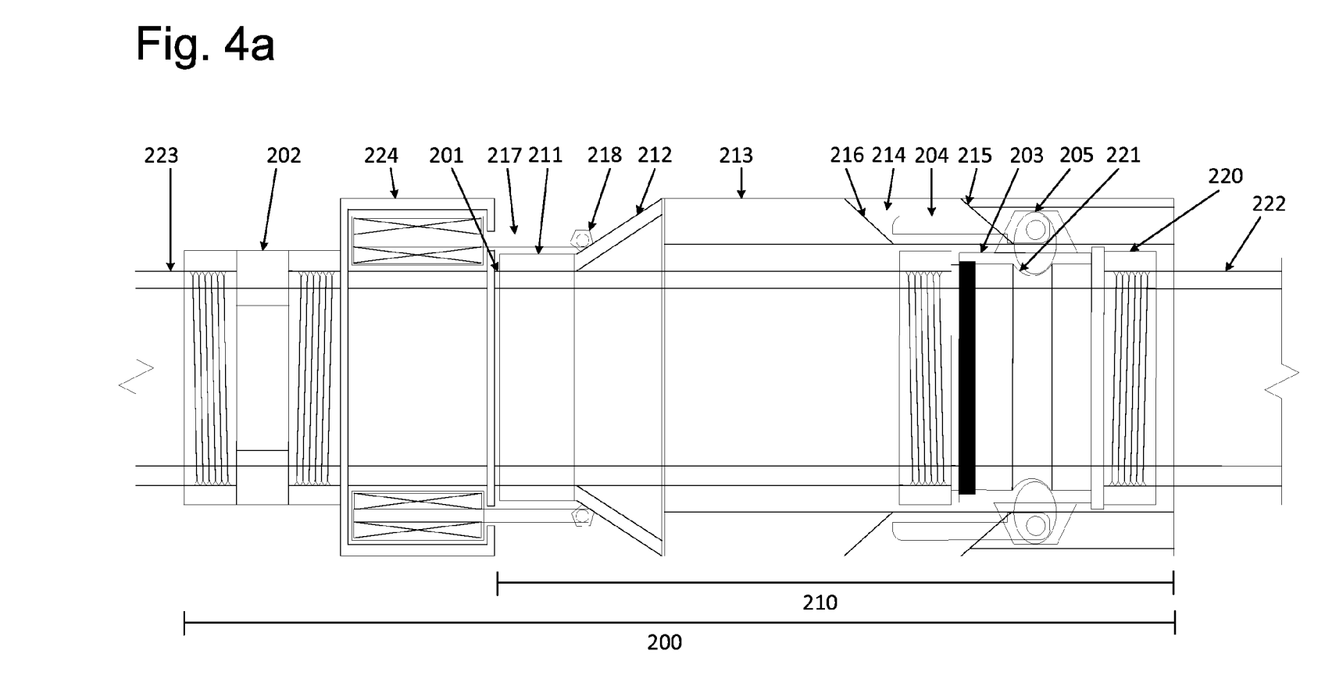
FIG. 4a is a longitudinal, cross-section view of a second embodiment of the present invention showing its internal construction and appearing as it would when coupled to a water supply system.
Figure 4B:
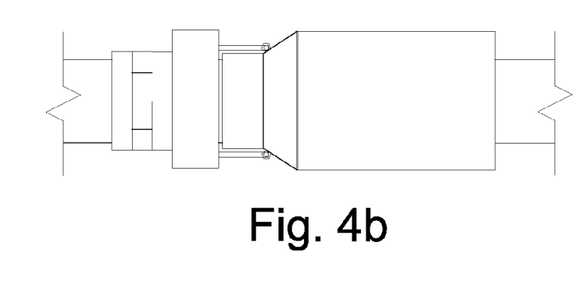
FIG. 4b is a longitudinal view of a second embodiment of the present invention appearing as it would when coupled to a water supply system.

Referring now to FIGS. 4a and 4b, a second embodiment of a remote cam-lock coupling actuator and discharge containment device 200 is disclosed. This second embodiment is similar to the first embodiment in all respects except that cam-lock coupling actuator and discharge containment shroud 210 is slidably displaced along central conduit or pipe 200 by means of force generated by motor 224 and transmitted via rigid rods 217 and pivots 218 to truncate cone 212. Motor 224 may be any of a number of well-known types including, but not limited to, an electric solenoid, a pneumatic actuator or a hydraulic actuator. Here, the user has actuated motor 224 to applied traction to rigid rods 217, pivots 218, and truncate cone 212 thus slidably displacing coupling actuator and containment shroud 210 away from female cam-lock coupling with female NPT threaded adapter 203. By this means, closing (locking) beveled ends 215 of longitudinal slots 214 slide over locking handles 204 and swing them down and towards female cam-lock coupling with female NPT threaded adapter 203 thus rotating lock cam lobes 205 into locking cam groove 221 machined or otherwise formed in male cam-lock coupler 220. This locks remote cam-lock coupling actuator and discharge containment device 200 and male cam-lock coupler 220 with attached water system pipe 222 together.

Figure 5A:
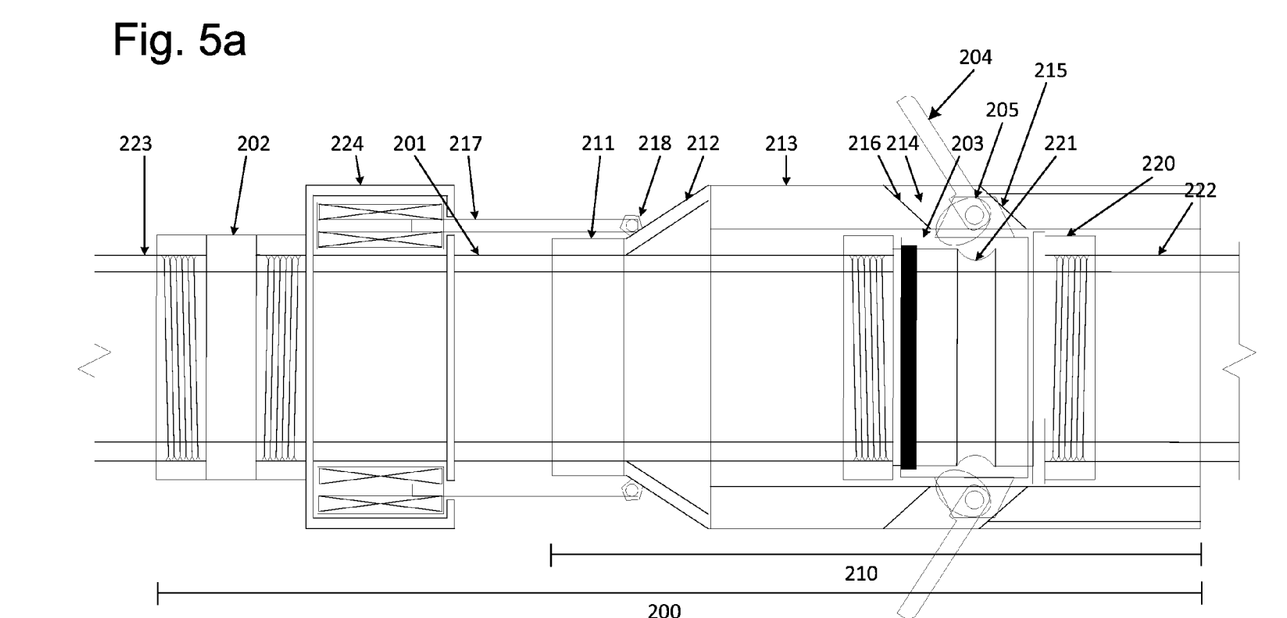
FIG. 5a is a longitudinal, cross-section view of a second embodiment of the present invention showing its internal construction and appearing as it would after the invention has been decoupled from a water supply system.
Figure 5B:
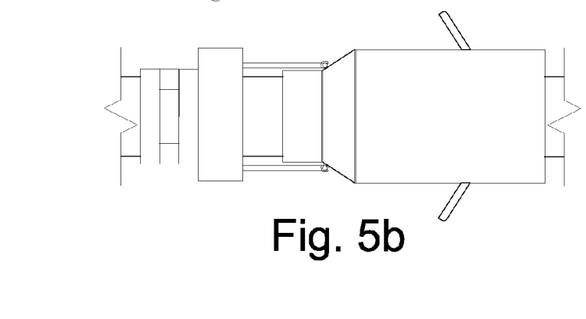
FIG. 5b is a longitudinal view of a second embodiment of the present invention appearing as it would when decoupled from a water supply system.

Referring now to FIGS. 5a and 5b, the user has actuated motor 224 to applied force to rigid rods 217, pivots 218, and truncate cone 212 thus slidably displacing coupling actuator and containment shroud 210 towards the female cam-lock coupling with female NPT threaded adapter 203. By this means, opening (unlocking) beveled ends 216 of longitudinal slots 214 slide under locking handles 204 and swing them back and away thus rotating lock cam lobes 205 out of locking cam groove 221 and unlocking remote cam-lock coupling actuator and discharge containment device 200 from male cam-lock coupler 220 and attached water system pipe 222.

Figure 6A:
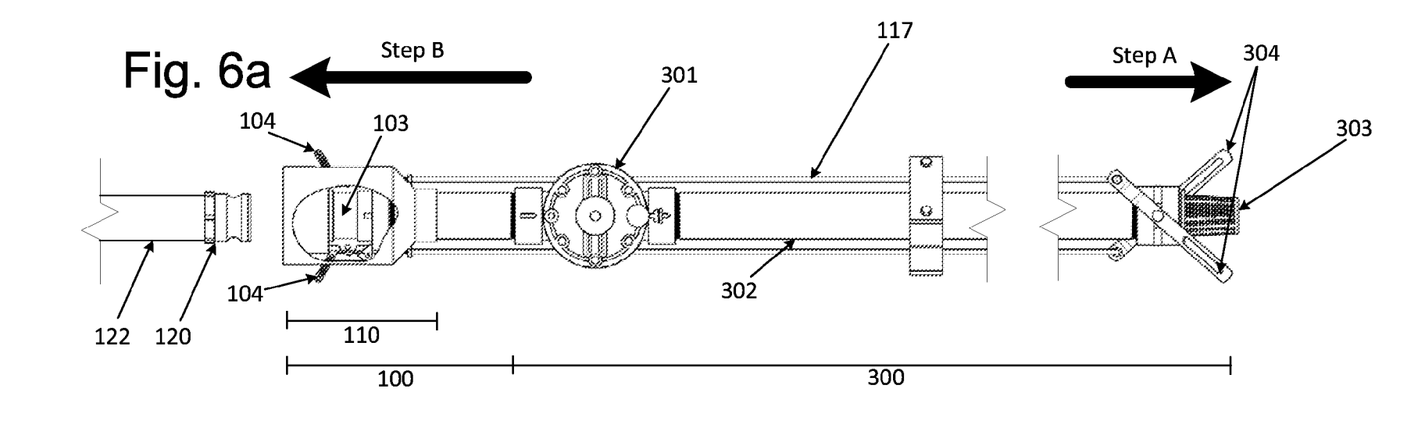
FIGS. 6a and 6b are longitudinal views of the first embodiment of the present invention illustrating its mode of use when connecting a flushing device to a public water system.
Figure 6B:
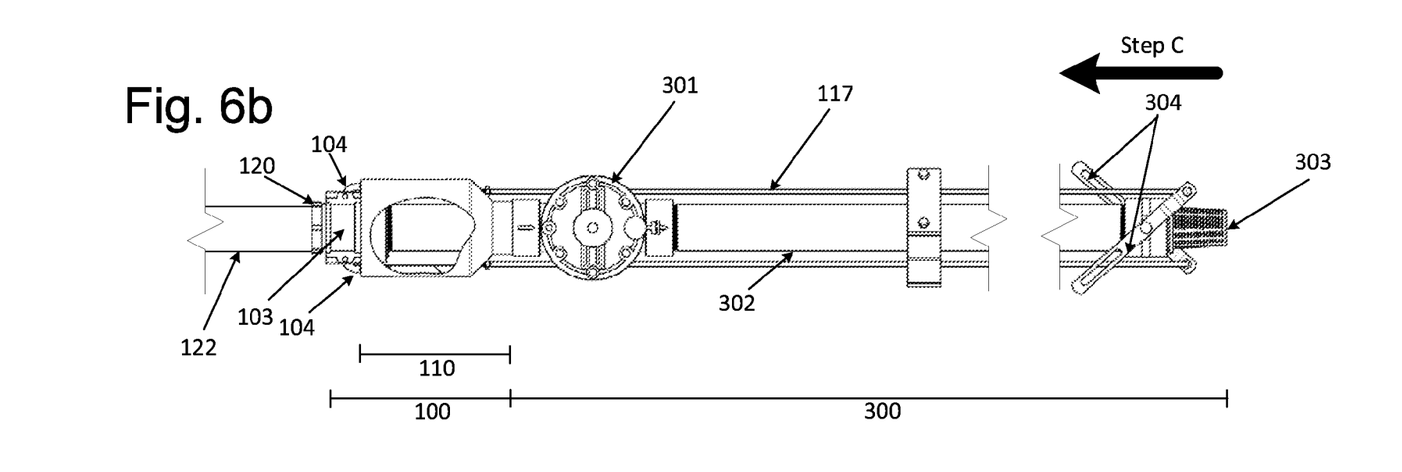

Referring now to FIGS. 6a and 6b, the first embodiment of the present invention is used to connect a flushing device 300 to a public water system. Here, flushing device 300 comprises solenoid activated valve 301, discharge pipe 302, and water diffuser 303. Affixed to discharge pipe 302 near water diffuser 303, are actuator handles 304. Actuator handles 304 are connected to rigid rods 117. In this example, female-to-female NPT threaded adapter 102 has been omitted and remote cam-lock coupling actuator and discharge containment device 100 directly connected to solenoid activated valve 301. In "Step A" the user pulls actuator handles 304 upward thus causing a force to be transmitted via rigid rods 117 to cam-lock coupling actuator and discharge containment shroud 110. Cam-lock coupling actuator and discharge containment shroud 110 is forced down as described supra and causes locking handles 104 to unlock female cam-lock coupling 103. In "Step B" flushing device 300 with remote cam-lock coupling actuator and discharge containment device 100 affixed is lowered onto subterranean male cam-lock coupler 120 and affixed water system pipe 122. In "Step C" the user pushes actuator handles 304 downward thus causing traction to be transmitted via rigid rods 117 to cam-lock coupling actuator and discharge containment shroud 110. Cam-lock coupling actuator and discharge containment shroud 110 is forced up as described supra and causes locking handles 104 to lock female cam-lock coupling 103 onto male cam-lock coupler 120 and affixed water system pipe 122. At some time in the future, these steps may be reversed and flushing device 300 with remote cam-lock coupling actuator and discharge containment device 100 may be removed from their subterranean location and easily accessed.

While the preferred embodiment of the present invention has been described in terms of an application wherein it is used to attach a flushing device to a public water system, it will be readily apparent that the present invention may be used to lock and unlock couplings associated with pipes carrying any of a variety of liquids or gaseous substances and that all such variations are included in the spirit and scope of the present disclosure.

What is claimed is:

1. A remotely operable actuator and discharge containment device for cam-lock couplings comprising:
   a. a passage for fluid with a female cam-lock coupling with locking handles disposed at one end for temporary attachment to a fluid source equipped with a male cam-lock coupling wherein said passage has a conduit for directing fluid to a fluidically coupled destination;
   b. an actuator and discharge containment shroud comprising:
      i. a first open end cylinder concentrically disposed around, and in intimate contact with, said passage such that it is slidably displaceable along the length of said passage;
      ii. a second open end cylinder larger in diameter than said first open end cylinder continuously affixed to and concentrically disposed around said first open end cylinder and extending beyond it towards said female cam-lock coupling;
      iii. longitudinal slots through said second open end cylinder such that said locking handles protrude into said longitudinal slots, each longitudinal slot further comprising an opening (unlocking) beveled end disposed away from said female cam-lock coupling and a closing (locking) beveled end nearer to said female cam-lock coupling;
      iv. at least one remotely operable rigid rod attached to said first open end cylinder and extending directly away from the joint between said female and male cam-lock couplings when they are coupled together and capable of slidably displacing said first and second open end cylinders along the length of said passage;
   c. such that when said first and second open end cylinders are slidably displaced towards said female cam-lock coupling, said opening (unlocking) beveled ends slide under said locking handles and unlock said female cam-lock coupling while said second open end cylinder contains any radially directed spray of fluid issuing forth between said female cam-lock coupling and said male cam-lock coupling; and,
   d. such that when said first and second open end cylinders are slidably displaced away from said female cam-lock coupling, said closing (locking) beveled ends slide over said locking handles and lock said female cam-lock coupling.

2. A remotely operable actuator and discharge containment shroud for cam-lock couplings of claim 1, further comprising an operating motor coupled to the at least one remotely operable rigid rod for slidably displacing said cam-lock coupling actuator and discharge containment shroud.

3. A remotely operable actuator and discharge containment shroud for cam-lock couplings of claim 2, wherein said operating motor is an electric solenoid.

4. A remotely operable actuator and discharge containment shroud for cam-lock couplings of claim 2, wherein said operating motor is a pneumatic actuator.

5. A remotely operable actuator and discharge containment shroud for cam-lock couplings of claim 2, wherein said operating motor is a hydraulic actuator.

6. A remotely operable discharge containment device for opening and closing a cam-lock coupling comprising an actuator and discharge containment shroud further comprising:
   a. a first open end cylinder concentrically disposed around, and in intimate contact with, the fluidic passage at the female end of a cam-lock coupling such that it is slidably displaceable along the length of said passage;
   b. a second open end cylinder larger in diameter than said first open end cylinder continuously affixed to and concentrically disposed around said first open end cylinder and extending beyond it towards said female cam-lock coupling;
   c. at least one longitudinal slot through said second open end cylinder such that a locking handle protrudes into each longitudinal slot, each longitudinal slot further comprising an opening (unlocking) beveled end disposed away from said female cam-lock coupling and a closing (locking) beveled end nearer to said female cam-lock coupling;
   d. at least one remotely operable rigid rod attached to said first open end cylinder and extending directly away from the joint between said female and a male cam-lock coupling when they are coupled together and capable of slidably displacing said first and second open end cylinders along the length of said passage;
      i. such that when said first and second open end cylinders are slidably displaced towards said female cam-lock coupling, said opening (unlocking) beveled ends slide under said locking handles and unlock said female cam-lock coupling while said second open end cylinder contains any radially directed spray of fluid issuing forth between said female cam-lock coupling and said male cam-lock coupling; and,
      ii. such that when said first and second open end cylinders are slidably displaced away from said female cam-lock coupling, said closing (locking) beveled ends slide over said locking handles and lock said female cam-lock coupling.

* * * * *